US008556008B2

(12) United States Patent
Einola et al.

(10) Patent No.: US 8,556,008 B2
(45) Date of Patent: Oct. 15, 2013

(54) METHOD AND ARRANGEMENT IN POWER TRANSMISSION OF FOREST MACHINE (75) Inventors: Kalle Einola, Tampere (FI); Pentti Hukkanen, Kiuruvesi (FI); Veikko Rintamaki, Seinajoki (FI)

(73) Assignee: Ponsse Oyj, Vierema (FI)

( * ) Notice: Subject to any disclaimer, the term of this patent is extended or adjusted under 35 U.S.C. 154(b) by 805 days.

(21) Appl. No.: 12/095,230

(22) PCT Filed: Nov. 27, 2006

(86) PCT No.: PCT/FI2006/050519
§ 371 (c)(1),
(2), (4) Date: May 28, 2008

(87) PCT Pub. No.: WO2007/060297
PCT Pub. Date: May 31, 2007

(65) Prior Publication Data
US 2008/0314659 A1 Dec. 25, 2008

(30) Foreign Application Priority Data
Nov. 28, 2005 (FI) .................................. 20051215

(51) Int. Cl.
*B60K 6/22* (2007.10)
(52) U.S. Cl.
USPC ....................................... 180/65.21; 180/165
(58) Field of Classification Search
USPC ........ 180/165, 65.1, 65.225, 305, 306, 65.21; 903/960
See application file for complete search history.

(56) References Cited

U.S. PATENT DOCUMENTS

| 3,555,356 | A | * | 1/1971 | Kaiser | 361/27 |
|---|---|---|---|---|---|
| 3,577,050 | A | * | 5/1971 | Ringland et al. | 318/146 |
| 3,658,104 | A | * | 4/1972 | Hamilton | 414/483 |
| 3,911,980 | A | * | 10/1975 | McColl | 144/4.1 |
| 4,093,900 | A | * | 6/1978 | Plunkett | 318/370 |
| 4,633,925 | A | | 1/1987 | Yasunaga | |
| 4,647,053 | A | * | 3/1987 | Kanno | 280/6.154 |
| 5,129,438 | A | * | 7/1992 | Hamilton | 144/343 |
| 6,592,336 | B1 | * | 7/2003 | Hirano et al. | 417/201 |

(Continued)

FOREIGN PATENT DOCUMENTS

| EP | 1191155 A1 | 3/2002 |
|---|---|---|
| EP | 1 219 751 A1 | 7/2002 |

(Continued)

OTHER PUBLICATIONS

International Search Report for PCT/FI2006/050519.
European Search Report, dated May 30, 2011, in Application No. EP 068200997.

*Primary Examiner* — Frank Vanaman
(74) *Attorney, Agent, or Firm* — Young & Thompson (57) ABSTRACT

A method and an arrangement in power transmission of a forest machine (1), the forest machine including a primary power source (5) for generating power required for moving and controlling the forest machine and/or actuators (6, 7) therein. In the present method and arrangement, at least part of the power generated by the primary power source (5) is converted into electric energy by a generator arrangement (8). This electric energy can be stored at least partly in an electricity storage unit (9), from which part thereof can be used, when required, for generating pressure medium-transmitted power for implementing a pressure medium-transmitted function of the forest machine (1) or at least one actuator (6, 7) therein.

25 Claims, 2 Drawing Sheets (56) References Cited

U.S. PATENT DOCUMENTS

| | | | |
|---|---|---|---|
| 6,666,022 B1 * | 12/2003 | Yoshimatsu et al. | 60/413 |
| 6,834,737 B2 * | 12/2004 | Bloxham | 180/165 |
| 2003/0226291 A1 | 12/2003 | Naruse et al. | |
| 2004/0098983 A1 | 5/2004 | Naruse et al. | |
| 2004/0124020 A1 * | 7/2004 | Leifert | 180/65.1 |

| | | |
|---|---|---|
| 2005/0036894 A1 | 2/2005 | Oguri |

FOREIGN PATENT DOCUMENTS

| | | |
|---|---|---|
| EP | 1291467 A1 | 3/2003 |
| FI | 6911 U1 | 12/2008 |
| WO | 2005081393 | 9/2005 |

* cited by examiner

333
METHOD AND ARRANGEMENT IN POWER TRANSMISSION OF FOREST MACHINE

BACKGROUND OF THE INVENTION

The present invention relates to a method of implementing the power transmission of a forest machine.

The invention also relates to an arrangement for implementing the power transmission of a forest machine.

In the power transmission of moving working machines, which in this context refer particularly to forest machines, a plurality of different power transmission means have been used as the technology has developed. In the case of forest machines, such power transmission may be considered to be divided into two different main classes on the basis of the purpose of use; on the one hand to the movement of the working machine itself, so-called propulsion, the required driving power transmission and, on the other hand, to the power transmission of the actuators comprised by the working machine, such as chargers, hoisters, felling heads and the like.

From the starting phases of mechanical harvesting, completely mechanical driving power transmission solutions are known that are based on different switches and mechanical transmissions, which enable a crude control of the direction of movement and speed of the vehicle. In such earlier forest machines, the loading of pieces of timber, such as logs, took place manually or by means of mechanical lifting aids operating via wires, such as lifting boom systems based on a winch.

In fact, a significant breakthrough in the field of forest machine technology was the realization of applying pressure medium-transmitted power transmission, which in this context refers generally to hydraulic power transmission in an apparatus employed for the loading and processing of timber. As a result of this realization, a so-called hydraulic knuckle boom charger was generated. In fact, hydraulic power transmission has established its position as the most common power transmission method in boom structures of moving working machines. The use of hydraulic technology in these applications is supported by its excellent power density, the flexible ways of placement thereof in moving structures and the feasibility to easily accomplish strong forces in a manageable and controllable manner.

For the implementation of stepless speed regulation in driving power transmission, in turn, hydrodynamic power transmission arrangements provided with a so-called torque converter have been developed and are known. In addition to an actual torque converter, the power transmission of a working machine may also be implemented with automatic transmission, practically composed of both a part similar to the torque converter and a transmission operating steplessly at more than one transmission ratios.

Power transmission solutions based on a torque converter are still in use in the transmission of high powers, for example in forest machines that are used for skidding whole tree trunks. Furthermore, hydrodynamic power transmission is still common in mining vehicles, such as dumpers, for example.

However, in forest machines utilizing a so-called CTL (Cut-to-Length) method, a change over to the use of chiefly hydrostatic power transmission in driving power transmission occurred years ago because of its better maneuverability and favourable braking characteristics. Hydrostatically implemented power transmission can also be more flexibly mounted into the structure of the machine than the above-described hydrodynamic power transmission. The implementation of such hydrostatic driving power transmission may be composed of for instance wheel-specific hydraulic engines or a hydrostatic/mechanic concept, wherein hydrostatic power transmission, typically composed of a hydraulic pump and a hydraulic engine, of which at least one has usually an adjustable rotational volume, is arranged between the primary power source of the working machine and the conventional, mechanical power transmission.

However, a drawback of hydrostatic power transmission can be considered its poor efficiency, particularly at high driving speeds. The efficiency also varies significantly depending on the loading situation.

Lately, manners of electrical implementation of the driving power transmission of various working machines have been surveyed, whereby the driving power transmission could be implemented either partly or even entirely electrically. The interest in electrical power transmission has increased particularly because of its favourable efficiency and the feasibility of using electric motors for braking and in this connection even for using them for energy recovery. Accordingly, heavy working machines, such as mining and quarry vehicles, for example, are known, whose driving power transmission is implemented entirely electrically. On the other hand, hybrid solutions of passenger cars, for example, are also known, wherein the effect of the driving power transmission is achieved partly by means of an electric motor and partly by means of a conventional combustion engine. An example of such an arrangement is set forth in patent EP1034968.

However, when forest machines are studied, the replacement of hydrostatic driving power transmission with electrical power transmission does not necessarily result in an important improvement in the overall efficiency of the forest machine. It does not either provide other particularly important advantages in the operating environment of the forest machine. In practice, such a driving power transmission solution would require at least two parallel, high-capacity power transmission systems in the forest machine.

In the case of forest machines in particular, the problems caused by electric power transmission in the forest machine environment result first and foremost from the momentary requirements of the various boom systems, hoisters, loaders, felling devices and other timber-processing devices for very high effects from the primary power source of the working machine. This way the primary power source is found to operate in a situation wherein the power source, dimensioned according to the maximum power required by the forest machine, is loaded very unevenly. During part of the operating time of the forest machine the power source is loaded even with a significantly slight partial load.

The above-mentioned functions of the various boom systems, hoisters, loaders, felling devices and other timber-processing devices of the forest machine are, however, extremely difficult to implement without pressure medium-transmitted hydraulic power transmission. In these applications, the advantage of hydraulic power transmission in particular is its extreme power density and good adjustability. Furthermore, the above-mentioned, hydraulically implemented functions are most frequently very critical as regards the performance and productivity of the forest machine. For example, when a forwarder is studied, the loader therein is in use for a significant portion of the working time, thus making high demands on the power source.

BRIEF DESCRIPTION OF THE INVENTION

The object of the present invention is thus to provide a method and an arrangement the implementation of the method so as to achieve an entirely new kind of solution to the problems caused by the abovementioned prior art drawbacks. This object is achieved by the method and arrangement for the power transmission of a forest machine having the characteristics of this invention as disclosed below.

More exactly expressed, the method of the present invention is disclosed below. The arrangement for implementing the method according to the invention is also disclosed below.

Preferred embodiments of the invention are described below.

Accordingly, the invention is based on the idea of implementing the power transmission of a forest machine by converting at least part of the effect of the primary power source of the forest machine with an electric generator, for example, into electric energy. This electric energy can be stored and discharged from its storage for re-use preferably for generating pressure medium-transmitted power via a hydraulic pump, for example. Particularly preferably the electric energy is stored in the desired location in a battery placed in a working machine or in some other known means that enables the charge of electric energy or a combination thereof, from which it can be utilized when required.

The invention brings forth significant advantages. Accordingly, it enables the improvement of the total efficiency of the forest machine, and at the same time, it facilitates the design of the forest machine by enabling an easier placement than previously of the components into the structure of the forest machine. In addition, the solution of the invention enables an even loading of the primary power source in the forest machine better than previously in spite of the fact that the momentary power level required by the different working phases performed by the forest machine may vary significantly.

The fulfillment of the momentary power requirement peaks thus obtained enables the dimensioning of the primary power source to be significantly smaller than usually. This is a significant advantage as regards the total fuel economy of the forest machine and the weight of the forest machine, for example. Naturally, a smaller power source also lowers the discharge level of the forest machine and lowers the noise level and the vibration level caused by the power source resulting in structural advantages.

Accordingly, the invention enables the direction of a substantially larger amount of power to the system particularly during the momentary high power requirements of the timber processing devices in the forest machine than the calculatory maximum power of the primary power source alone would allow, without the rest of the operation of the forest machine being interfered with thereby. This is possible, since the required extra power can be taken in the form of electric energy stored in different charging means. If need be, such electric energy can be further converted into hydraulic power, which is guided to the timber-processing device, by means of a hydraulic pump driven by an electric motor, for example.

In a case of the described type, the manufacturer of the forest machine is faced with the option to dimension the primary power source therein optimally for its purpose. Such a primary power source can indeed operate with the best possible efficiency, at a speed of rotation and a loading best suited thereto, for example. This again results in the abovementioned low fuel consumption, which has an increasingly important significance from the point of view of the owner and user of the forest machine, as fuel prices continue to rise. With an optimally even and well predictable loading of the primary power source, the increasingly tightening discharge regulations can also be fulfilled more easily.

Since the solution of the invention enables the electric transfer of at least part of the power required by hydraulic functions closer to the point of use in the structure of the working machine, laborious pressure medium lines are also avoided to a great degree. In addition to structural problems, also flow losses are always caused therein, and they tend to weaken the efficiency of the power transmission.

On the other hand, a surprising advantage of the invention is the feasibility to place the pumps, control valves and devices associated with the pressure medium-transmitted system of the forest machine into one or more compact arrangements at a distance from the primary power source. Such a location may be in association with the pressure medium container, for example. This placement has significant effects on the reduction of the noise level in the control cabin of a forwarder, for example, since noisy pumps and valves may be placed in some cases into the base of a hoister in the forest machine, for example, in contrast with prior art, or even inside a pressure medium container in the system. Accordingly, the different components associated with this pressure medium-transmitted system can be placed even into a different chassis part of the forest machine than its control cabin and the primary power source.

In known solutions, one or more pressure medium pumps for pressuring pressure medium for the use of the different functions of the forest machine have had to be placed with the use of mechanical connecting members to the vicinity of the primary power source. This has resulted in a large and bulky aggregate being generated in the vicinity of the primary power source, the placement of which aggregate onto the chassis of the forest machine has often caused difficulties. Thanks to the solution of the invention, this structure can now be decentralized. Since the primary power source itself can be implemented smaller-sized, the placement thereof in the structure of the forest machine can also be reconsidered.

Other advantages brought forth by the invention are described in the following, more detailed description of specific embodiments of the invention.

BRIEF DESCRIPTION OF THE FIGURES

In the following, some preferred embodiments of the invention will be described in more detail with reference to the accompanying drawing, in which.

DETAILED DESCRIPTION OF PREFERRED EMBODIMENTS

In the following, some preferred embodiments of the power transmission of a forest machine in the present method and arrangement will be described with reference to the above-mentioned figures. The arrangement comprises the structural parts designated with reference numerals in the figures and corresponding to the reference numerals employed in the present description.

Figure 1:
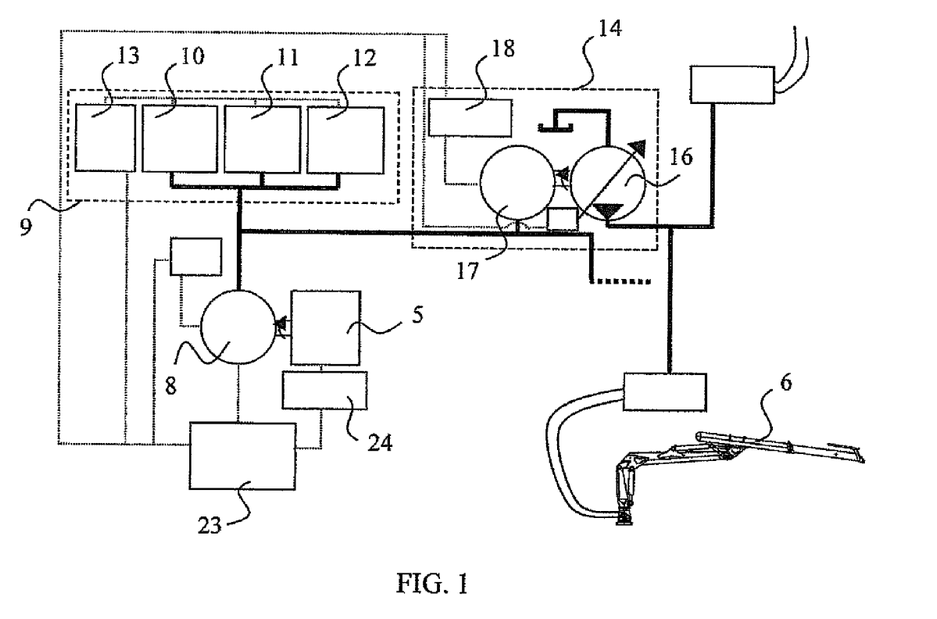
FIG. 1 shows a schematic view of the present arrangement for power transmission and controlling an actuator.
Figure 3:
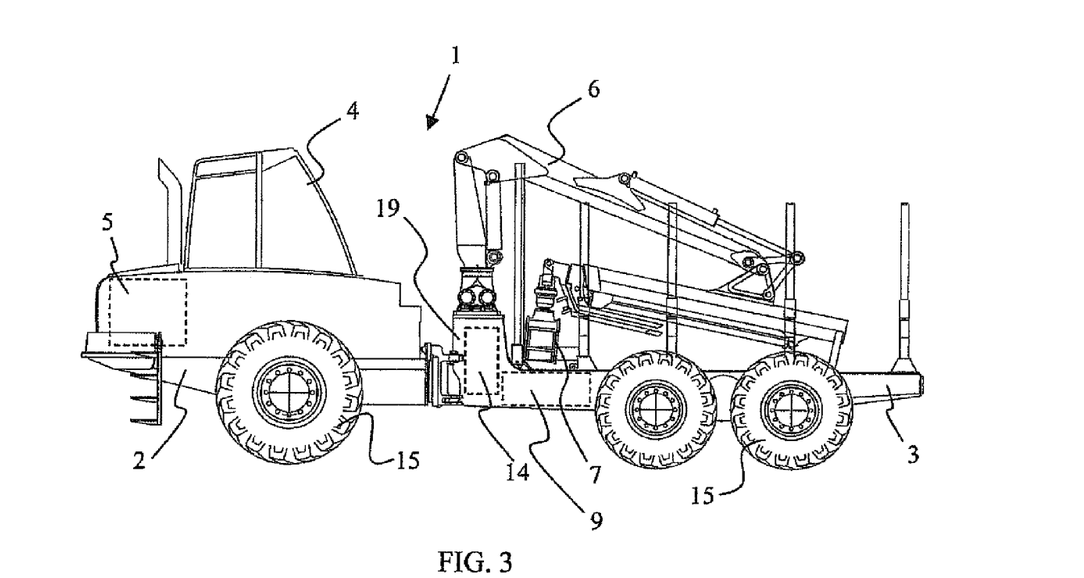

FIG. 1 shows a basic solution of the present arrangement in the power transmission of a forest machine. The arrangement is provided for example in a forest machine 1 according to FIG. 3, comprising a front and rear chassis 2 and 3 articulated to one another. The front chassis comprises a forest machine control cabin 4 for controlling a primary power source 5 therein for generating the power required for moving and controlling the forest machine and the actuators therein. In FIG. 3, such actuators are represented by a charger 6 and a grabbing bucket 7 connected thereto. The figures show the components of the arrangement and the electric and pressure medium lines only schematically, simplified for exemplifying the structure and operation of the arrangement.

In contrast to what is customary, in the present arrangement for power transmission, at least part of the power generated by the primary power source 5 is adapted to be guided into a generator arrangement 8, known per se, wherein the mechanical energy generated by the primary power source is converted into electric energy. Part of this electric energy is immediately usable for controlling the forest machine 1, for its displacement from one location to another and for controlling other low-power control and operating systems. However, part of the electric energy generated is arranged to be storable for a shorter or longer time in one or more electricity storage means 9, which are represented by conventional batteries 10, super capacitors 11 or other means 12 suited to store electricity in FIG. 1. The figure also shows an electric energy control unit 13 associated with the storage means and arranged to manage the loading and discharge of the storage means.

The primary purpose of such means 10 to 12 intended to store electricity is to lead at least part of the electric energy from the storage means 9 to one or more conversion means 14 in the arrangement, when required, to use the stored electric energy for generating pressure medium-transmitted power in one or more locations. Accordingly, the arrangement achieves a kind of power generation units operating in parallel with the primary power source 5 of the forest machine 1. On the one hand, the power generated by the primary power source can thus be converted into electric energy and utilized immediately as such for controlling the forest machine. Accordingly, the forest machine can be used for a limited period of time without any operation of the primary power source. On the other hand, the electric energy discharged from the storage means 9 can be preferably employed for fulfilling a momentarily risen power requirement.

In the latter case, said risen power requirement can be fulfilled, either immediately with electric energy discharged from the storage means 9 or alternatively this electric energy is convertible into pressure medium-transmitted power with means in the forest machine 1 for this purpose, preferably into hydraulic power for controlling the actuators of the forest machine, for example. Naturally, it is possible to convert the electric energy employed for controlling the forest machine into hydraulic power by adapting the conversion means 14 in connection with wheels 15 of the forest machine, for example.

The pressure medium-transmitted power generated in the conversion means 14 with the present arrangement is particularly adapted to control a timber-processing device in the forest machine 1, such as a pressure medium-transmitted hoister, charger 6, boom system or the use of a timber processing device, such as a felling head or grabbing bucket 7 supported or used at the end thereof. It is naturally possible to control such devices also only partly with the pressure medium-transmitted power generated in the conversion means or to use it only to control the use of an actuator that implements a single working movement of a timber processing device in the forest machine.

The conversion means 14 in the arrangement preferably comprises a pump unit 16 for pressurizing the pressure medium in the pressure medium-transmitted arrangement of the forest machine and an electric motor 17 for driving it, which is a permanent magnet motor or a short circuit motor, for example. A special control unit 18 is adapted to control the operation of the electric motor. If the pump unit is of the adjustable volume type, the volume flow produced thereby can be affected by changing both the speed of rotation and the rotational volume. When the conversion means employed for achieving the pressure medium-transmitted power comprises a fixed-volume pump unit, the adjustment of its volume flow is preferably arranged to take place by the adjustment of the speed of rotation of an electric motor adapted to drive the pump unit. The speed of such an electric motor is adapted to be controlled with a frequency converter connected to the system, for example. The solution enables the utilization of gear-type pumps having inexpensive purchase prices and other pumps of the fixed volume type having inexpensive purchase prices in the conversion means.

When the conversion means 14 employed for generating hydraulic power comprises a pump unit 16 having an adjustable volume, an electric motor 17, preferably rotating at a speed of rotation optimized for the purpose, can be adapted to drive the pump unit.

In the arrangement, the primary power source 5 of the forest machine 1 is provided with a generator arrangement 8 in connection therewith. It may even be integrated into the primary power source itself for achieving a compact structure.

A particular advantage achieved with the arrangement is to be considered the option to place the conversion means 14 employed for achieving the pressure medium-transmitted power almost anywhere in the layout of the forest machine 1. Accordingly, at least one conversion means can be placed substantially in connection with a pressure medium container in the forest machine. The conversion means can be adapted even inside such a pressure medium container, whereby the noise generated thereby can be efficiently dampened. A solution can also be selected, wherein the conversion means and the electric motor 17 therein are placed on the rear chassis 3 in the forest machine. Such separation of the conversion means from the primary power source 5 simplifies the design of the layout of the forest machine, particularly the forwarder, enabling a better weight distribution of the forest machine than previously.

The conversion means 14 and the pump units 16 and electric motors 17 therein can even be placed in a base 19 in the charger 6 mounted on the rear chassis 3 for avoidance of long pressure medium lines.

Figure 2:
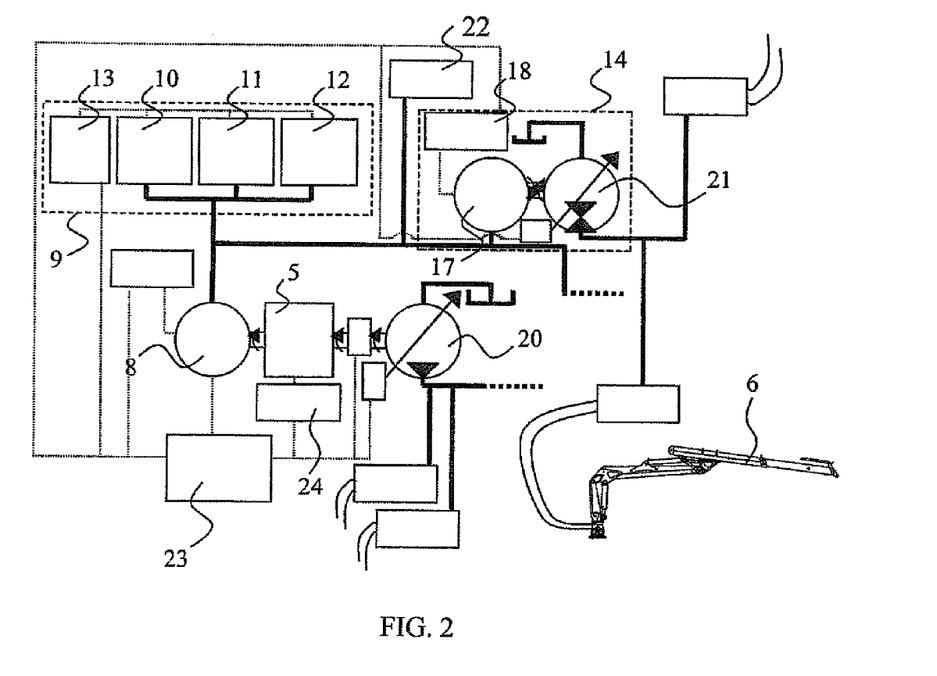
FIG. 2 shows an alternative embodiment of the arrangement of FIG. 1, and FIG. 3 schematically shows a side view of a forest machine.

The one or more storage means 9 distinguished in FIGS. 1 and 2 are preferably placed inside or in connection with the rear chassis 3 of the forest machine 1.

FIG. 2 shows an alternative embodiment of the present arrangement. This arrangement comprises the same main components as the arrangement of FIG. 1, provided, however, with some additional features. Accordingly, FIG. 2 shows an arrangement wherein the primary power source 5 of the forest machine 1 is employed not only for generating electric energy but also for generating pressure medium-transmitted power by means of a pressure medium pump 20 connected to the primary power source. The pressure medium-transmitted power thus generated may be used both for controlling the forest machine and for controlling the devices therein. The pressure medium-transmitted power may even be partly utilized for controlling the same devices employed in timber processing that are otherwise driven by electric energy with the pressure medium-transmitted power generated by means of the conversion means 14.

FIG. 2 also shows an arrangement wherein the conversion means 14 driven for generating power medium-transmitted power comprises a pump unit that is a pump motor 21 rotating in both directions. An electric motor 17 driving such a pump motor is also adaptable to operate for recovering energy, whereby it constitutes a generator that feeds electric energy into the storage means 9. In this case, for example, when a load hydraulically supported in the charger 6 is lowered, the backflow of pressure medium can be utilized in such a manner that the energy comprised thereby can be converted into electric energy. Naturally, the electric energy produced thereby can also be directed to be used by the electric actuators 22 comprised by the system or to be stored in the electricity storage means.

The arrangement in the power transmission of the forest machine 1 according to FIGS. 1 and 2 operates as follows. Power required for moving and controlling the forest machine and the actuators therein is generated in the primary power source 5 of the forest machine, whereby the operating instructions are obtained from the user of the forest machine, conveyed by control devices 23. At least part of this mechanical power generated by the primary power source managed by the engine control unit (ECU) 24 is converted by means of the generator arrangement 8 into electric energy, which is stored at least partly in one or more electricity storage means 9 comprised by the forest machine. Such storage may be both short-term and long-term. Such storage means enable the discharge of the electric energy stored therein even within a very short time, if need be, should the power requirement of the forest machine suddenly increase.

When the power requirement of the forest machine 1 increases and exceeds the power generation capacity of the primary power source 5, part of the electric energy is led from the storage means 9 to one or more conversion means 14. In such a conversion means, electric energy is employed for generating pressure medium-transmitted power, preferably hydraulic power. This pressure medium-transmitted power is guided into one or more actuators located at different locations in the forest machine. In an actuator, the pressure medium-transmitted power is used to implement a pressure medium-transmitted function or to enhance the operation. Consequently, the pressure medium-transmitted power is used to either entirely or at least partly control a device that processes timber in the forest machine, for example. The pressure medium-transmitted power can also be used to control a single working movement of a timber-processing device comprised by the forest machine. The solution achieves a high efficiency, since such a pressure medium-transmitted system can be function-specifically optimized for each function.

When energy recovery is arranged in at least one such electric energy conversion means 14, the fuel economy of the forest machine 1 can be significantly improved. A manner of achieving such energy recovery is such that the structure of the above-mentioned conversion means allows it to be used also for the conversion of the energy contained by the pressure medium and its feeding back to the electric system to the use of the electric actuators or for storage in the electricity storage means 9.

It is obvious to a person skilled in the art that as technology advances, the basic idea of the above-described method and the arrangement for the implementation thereof can be implemented in a variety of ways. Consequently, the solution presented and its embodiments are not restricted to the examples described, but may vary within the scope of the claims. For example, it is evident that various solutions are associated with the generator, electric motor and electric energy storage components that are not separately described in this context.

The invention claimed is:

1. A method in the power transmission of a forest machine (1), the forest machine comprising a front chassis (2) and a rear chassis (3) articulated to one another, a primary hydrostatic power source (5) arranged on the front chassis (2) for generating hydrostatic power required for moving and controlling the forest machine and an actuator (6,7) therein, the primary power source under control of control devices (23), said method comprising the steps of:
   converting at least part of the power generated by the primary power source (5) into electric energy by a generator arrangement (8);
   storing the electric energy generated by the generator arrangement (8) in an electricity storage means (9);
   leading at least part of the electric energy from the storage means (9) to a conversion means (14) located separated from the primary power source (5) on the rear chassis (3), the conversion means (14) being a pressure medium-transmitted power generating source separate from the primary power source (5), and, when an operating instruction obtained from a user of the forest machine is conveyed by the control devices (23) to the primary power source (5) includes an immediate increased power requirement of the forest machine which exceeds a power generation capacity of the primary power source, with the electric energy from the storage means (9) providing additional electric energy for use by the conversion means (14), simultaneously and parallel with the power source (5), generating additional pressure medium-transmitted power for implementing a pressure medium-transmitted function of one of i) the forest machine (1) and ii) the actuator (6,7) responsive to the immediate increased power requirement; and
   at least partly hydraulically controlling a hydraulic timber-processing device responsive to the immediate increased power requirement of the forest machine (1) using hydraulic power from the additional pressure medium-transmitted power generated in said conversion means (14).

2. A method as claimed in claim 1, wherein,
   the timber-processing device comprises hydraulic actuators, the actuators comprising a hydraulic charger (6) connected to the forest machine and a hydraulic grabbing bucket (7) connected to the charger, the actuators being at least partly controlled by using the additional pressure medium-transmitted power generated in said conversion means (14) in response to the immediate increased power requirement.

3. A method as claimed in claim 1, comprising the further step of arranging energy recovery in the conversion means (14) in such a manner that the conversion means is employed for converting energy contained in the pressure medium and for feeding the converted energy back for use by electric actuators.

4. A method as claimed in claim 1, comprising the further step of arranging energy recovery in the conversion means (14) in such a manner that the conversion means is employed for converting energy contained in the pressure medium and for feeding the converted energy back for storage in the electricity storage means (9).

5. A method as claimed in claim 1, wherein the conversion means (14) comprises an electric motor (14) employed for generating the pressure medium-transmitted power.

6. A method as claimed in claim 1, comprising the further step of controlling the speed of the electric motor (17) with a frequency converter.

7. A method as claimed in claim 1, comprising the further step of controlling the use of an actuator implementing a single working movement of the timber-processing device with the pressure medium-transmitted power.

8. An arrangement in the power transmission of a forest machine (1), the forest machine comprising:
- a front chassis (2) and a rear chassis (3) articulated to one another;
- a primary hydrostatic power source (5) arranged on the front chassis (2) for generating hydrostatic power required for moving and controlling at least one of i) the forest machine and ii) actuators (6,7) therein;
- a generator arrangement (8) connected to the primary power source for generating electric energy;
- an electric energy storage means (9) connected to store at least part of the generated electric energy from the generator arrangement;
- a conversion means (14) connected to the storage means (9), the conversion means (14) being located on the rear chassis (3) separated from the primary power source (5), the conversion means (14) being a pressure medium-transmitted power generating source separate from the primary power source (5),
- said conversion means (14) adapted to, simultaneously and parallel with the power source (5), generate additional pressure medium-transmitted power to at least partly control a hydraulic timber-processing device responsive to an immediate increased power requirement of the forest machine (1) which exceeds a power generation capacity of the primary power source.

9. An arrangement as claimed in claim 8, wherein the conversion means (14) comprises an electric motor (17).

10. An arrangement as claimed in claim 9, wherein the conversion means (14) comprises means for recovering energy in energy contained in the pressure medium into electric energy.

11. An arrangement as claimed in claim 9, wherein the conversion means (14) for generating the pressure medium-transmitted power comprises a fixed-volume pump unit (16), an adjustment of volume flow of the pump unit being adapted to take place by adjusting a speed of rotation of the electric motor (17).

12. An arrangement as claimed in claim 9, wherein the conversion means (14) for generating the pressure medium-transmitted power comprises an adjustable-volume pump unit (16), the electric motor (17) is adapted to drive the pump unit, the electric motor being arranged to rotate at an optimized speed of rotation.

13. An arrangement as claimed in claim 9, wherein the conversion means (14) for generating the pressure medium-transmitted power comprises a pump unit (21) that is a pump motor rotating in both directions, the electric motor (17) being adaptable to serve as a generator supplying electric energy to the storage means (9) when a load in hydraulic movement is being braked.

14. An arrangement as claimed in claim 9, wherein the conversion means (14) and the electric motor (17) therein are located in a base (19) comprised by a charger (6) installed on a rear chassis (3).

15. An arrangement as claimed in claim 9, wherein the timber-processing device comprises an actuator of a charger (6) connected to the forest machine and an actuator of a grabbing bucket (7) connected to the charger, the actuators of the charger and the grabbing bucket being controlled by the pressure medium-transmitted power generated by the conversion means (14).

16. An arrangement as claimed in claim 8, wherein the pressure medium-transmitted power generated in the conversion means (14) is adapted to control the use of an actuator implementing a single working movement of the timber-processing device in the forest machine (1).

17. An arrangement as claimed in claim 8, wherein the generator arrangement (8) is connected with the primary power source (5) of the forest machine (1).

18. An arrangement as claimed in claim 8, wherein the generator arrangement (8) is integrated into the primary power source (5).

19. An arrangement as claimed in claim 8, wherein the conversion means (14) for generating the pressure medium-transmitted power is adapted substantially in connection with a pressure medium container comprised by the arrangement.

20. An arrangement as claimed in claim 8, wherein the conversion means (14) for generating the pressure medium-transmitted power is driven with a permanent magnet motor.

21. An arrangement as claimed in claim 8, wherein the conversion means (14) for generating the pressure medium-transmitted power is driven with a short circuit motor.

22. An arrangement as claimed in claim 8, wherein the conversion means (14) for generating the pressure medium-transmitted power is driven with an electric motor (17), the speed thereof being adapted to be controllable.

23. An arrangement as claimed in claim 22, wherein the electric motor (17) is adapted to be controllable with a frequency converter.

24. An arrangement in the power transmission of a forest machine (1), the forest machine (1) comprising:
- a front chassis (2) articulated to a rear chassis (3);
- actuators, the actuators comprising a charger (6) connected to the forest machine and a grabbing bucket (7) connected to the charger, the charger and the grabbing bucket being a timber-processing device;
- a primary hydrostatic power source arranged on the front chassis for generating hydrostatic mechanical energy power for moving and controlling the forest machine and the actuators, the primary power source under control of control devices (23);
- a generator arrangement (8) for generating electric energy, the generator arrangement (8) power by the primary power source (5);
- storage elements (9) connected to store at least part of the generated electric energy from the generator arrangement (8);
- a conversion means (14) arranged on the rear chassis at a location separated from the primary power source, the conversion means (14) being a pressure medium-transmitted power generating source separate from the primary power source (5),
- the conversion means (14) connected to the storage elements (9) so that electric energy stored in the storage elements (9) is led from the storage elements to the conversion means (14),
- the conversion means comprising an electric motor (17),
- the conversion means comprising an arrangement (16) for generating pressure medium-transmitted power at one or more locations separated from the primary power source (5),
- the conversion means (14) adapted to at least partly control the timber-processing device by the pressure medium-transmitted power generated therein,
- the conversion means generating the pressure medium-transmitted power in parallel with the primary power source (5) running to generate electric power via the generator arrangement (8), wherein, i) the power generated by the primary power source (5) is converted into electric energy by the generator arrangement (8) for immediate utilization for controlling the forest machine, the electric energy stored in the storage elements (9) being fed to the conversion means (14) for generating pressure medium-transmitted power allowing use of the forest machine for a limited period of time without any operation of the primary power source, and ii) the storage elements (9) are configured so that electric energy discharged from the storage elements (9) is employed in parallel with the primary power source for fulfilling a momentarily risen power requirement, when operating instructions obtained from a user of the forest machine, and being conveyed by the control devices (23) to the primary power source (5) includes an immediate power requirement of the forest machine which exceeds the power generation capacity of the primary power source, both as electric power and as the pressure medium-transmitted power, with the conversion means (14) at least partly controlling the timber-processing device by the pressure medium-transmitted power generated therein, wherein, responsive to the immediate increased power requirement, the conversion means (14) is used, simultaneously and parallel with the power source (5), to generate the pressure medium-transmitted power for implementing the pressure medium-transmitted function of one of i) the forest machine (1) and ii) the actuator (6,7).

25. The arrangement of claim 24, wherein the conversion means (14) comprises a pump unit (16) and an electric motor (17) located in a base (19) of the charger (6) mounted on the rear chassis (3).

* * * * *

UNITED STATES PATENT AND TRADEMARK OFFICE
CERTIFICATE OF CORRECTION

PATENT NO.       : 8,556,008 B2                                           Page 1 of 1
APPLICATION NO.  : 12/095230
DATED            : October 15, 2013
INVENTOR(S)      : Einola et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 814 days.

Signed and Sealed this
Fifteenth Day of September, 2015

Michelle K. Lee
*Director of the United States Patent and Trademark Office*